United States Patent
Govardhan et al.

(10) Patent No.: US 10,958,683 B2
(45) Date of Patent: Mar. 23, 2021

(54) METHOD AND DEVICE FOR CLASSIFYING UNIFORM RESOURCE LOCATORS BASED ON CONTENT IN CORRESPONDING WEBSITES

(71) Applicant: WIPRO LIMITED, Bangalore (IN)

(72) Inventors: Sridhar Govardhan, Bangalore (IN); Sunil Varkey, Tiruvalla (IN)

(73) Assignee: Wipro Limited, Bangalore (IN)

( * ) Notice: Subject to any disclaimer, the term of this patent is extended or adjusted under 35 U.S.C. 154(b) by 274 days.

(21) Appl. No.: 16/008,065

(22) Filed: Jun. 14, 2018

(65) Prior Publication Data

US 2019/0334947 A1   Oct. 31, 2019

(30) Foreign Application Priority Data

Apr. 26, 2018   (IN) .............................. 201841015809

(51) Int. Cl.
| | |
|---|---|
| H04L 29/06 | (2006.01) |
| G06F 16/28 | (2019.01) |
| G06N 20/00 | (2019.01) |
| G06K 9/00 | (2006.01) |
| G06K 9/34 | (2006.01) |
| G06K 9/62 | (2006.01) |
| H04L 29/08 | (2006.01) |

(52) U.S. Cl.
CPC ........ *H04L 63/1483* (2013.01); *G06F 16/285* (2019.01); *G06K 9/00456* (2013.01); *G06K 9/00463* (2013.01); *G06K 9/344* (2013.01); *G06K 9/6256* (2013.01); *G06K 9/6262* (2013.01); *G06N 20/00* (2019.01); *H04L 67/02* (2013.01); *G06K 2209/01* (2013.01)

(58) Field of Classification Search
CPC ...... H04L 63/1483; H04L 63/14–1491; G06K 2209/01–013
See application file for complete search history.

(56) References Cited

U.S. PATENT DOCUMENTS

| 2006/0253581 A1* | 11/2006 | Dixon ................... G06Q 30/02 709/225 |
| 2007/0136806 A1 | 6/2007 | Berman |
| 2010/0313266 A1 | 12/2010 | Feng et al. |
| | | (Continued) |

OTHER PUBLICATIONS

L. Wu, X. Du and J. Wu, "MobiFish: A lightweight anti-phishing scheme for mobile phones," 2014 23rd International Conference on Computer Communication and Networks (ICCCN), Shanghai, 2014, pp. 1-8.*

*Primary Examiner* — Matthew T Henning (74) *Attorney, Agent, or Firm* — Finnegan, Henderson, Farabow, Garrett & Dunner, LLP (57) ABSTRACT

A method and device for classifying uniform resource locators based on content in corresponding websites includes extracting, by a network device, a plurality of website contents from a website associated with a URL based on Optical Character Recognition (OCR). Each of the plurality of website contents are classified into a plurality of webpage categories based on machine learning. User actions for the plurality of website contents are simulated based on a webpage category associated with each of the plurality of website contents. An access classification is determined for the URL based on results of simulating the user actions and machine learning.

20 Claims, 6 Drawing Sheets

(56) References Cited

U.S. PATENT DOCUMENTS

2012/0158626 A1    6/2012  Zhu et al.
2018/0041530 A1*  2/2018  Tang .................... G06F 16/951
2019/0068638 A1*  2/2019  Bartik ................ H04L 63/1483

* cited by examiner

METHOD AND DEVICE FOR CLASSIFYING UNIFORM RESOURCE LOCATORS BASED ON CONTENT IN CORRESPONDING WEBSITES

TECHNICAL FIELD

This disclosure relates generally to classifying Uniform Resource Locators (URLs) and more particularly to method and device for classifying uniform resource locators based on content in corresponding websites.

BACKGROUND

As per an industry report, 43% of data breaches commenced with phishing emails. The weakest link and highly exploited element in a phishing attack is the human element. Phishing is a type of social engineering attack, using which, the attacker cleverly manipulates and tricks the victim into responding. Primary motive of a phishing attack may be to gather user credentials in order to commit financial fraud or Internet Protocol (IP) theft. To achieve this motive, an attacker may create a special phishing attack targeting users and may build a look-alike website that is fake. This look-alike website may gather information from the users, for example, credentials, personal information, or banking information. This information may later be used for unlawful objectives.

Conventional signature based detection security solutions may be unsuccessful in detecting and protecting against phishing threats, since each phishing attack is unique and polymorphic. Moreover, each webpage content may persistently be made unique with a fake domain. Additionally, these conventional solutions do not take into consideration the human factor and completely ignore the social engineering attacks. This lacuna in technology is exploited by attackers.

SUMMARY

In one embodiment, a method for classifying Uniform Resource Locators (URLs) based on content in corresponding websites is disclosed. The method includes extracting, by a network device, a plurality of website contents from a website associated with a URL based on Optical Character Recognition (OCR). The method further includes classifying, by the network device, each of the plurality of website contents into a plurality of webpage categories based on machine learning. The method includes simulating, by the network device, user actions for the plurality of website contents, based on a webpage category associated with each of the plurality of website contents. The method further includes determining, by the network device, an access classification for the URL based on results of simulating the user actions and machine learning.

In another embodiment, a network device for classifying Uniform Resource Locators (URLs) based on content in corresponding websites is disclosed. The computing device includes a processor and a memory communicatively coupled to the processor, wherein the memory stores processor instructions, which, on execution, causes the processor to extract a plurality of website contents from a website associated with a URL based on Optical Character Recognition (OCR). The processor instructions further cause the processor to classify each of the plurality of website contents into a plurality of webpage categories based on machine learning. The processor instructions cause the processor to simulate user actions for the plurality of website contents, based on a webpage category associated with each of the plurality of website contents. The processor instructions further cause the processor to determine an access classification for the URL based on results of simulating the user actions and machine learning.

In yet another embodiment, a non-transitory computer-readable storage medium is disclosed. The non-transitory computer-readable storage medium has instructions stored thereon, a set of computer-executable instructions causing a computer comprising one or more processors to perform steps comprising extracting a plurality of website contents from a website associated with a URL based on Optical Character Recognition (OCR); classifying each of the plurality of website contents into a plurality of webpage categories based on machine learning; simulating user actions for the plurality of website contents, based on a webpage category associated with each of the plurality of website contents; and determining an access classification for the URL based on results of simulating the user actions and machine learning.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
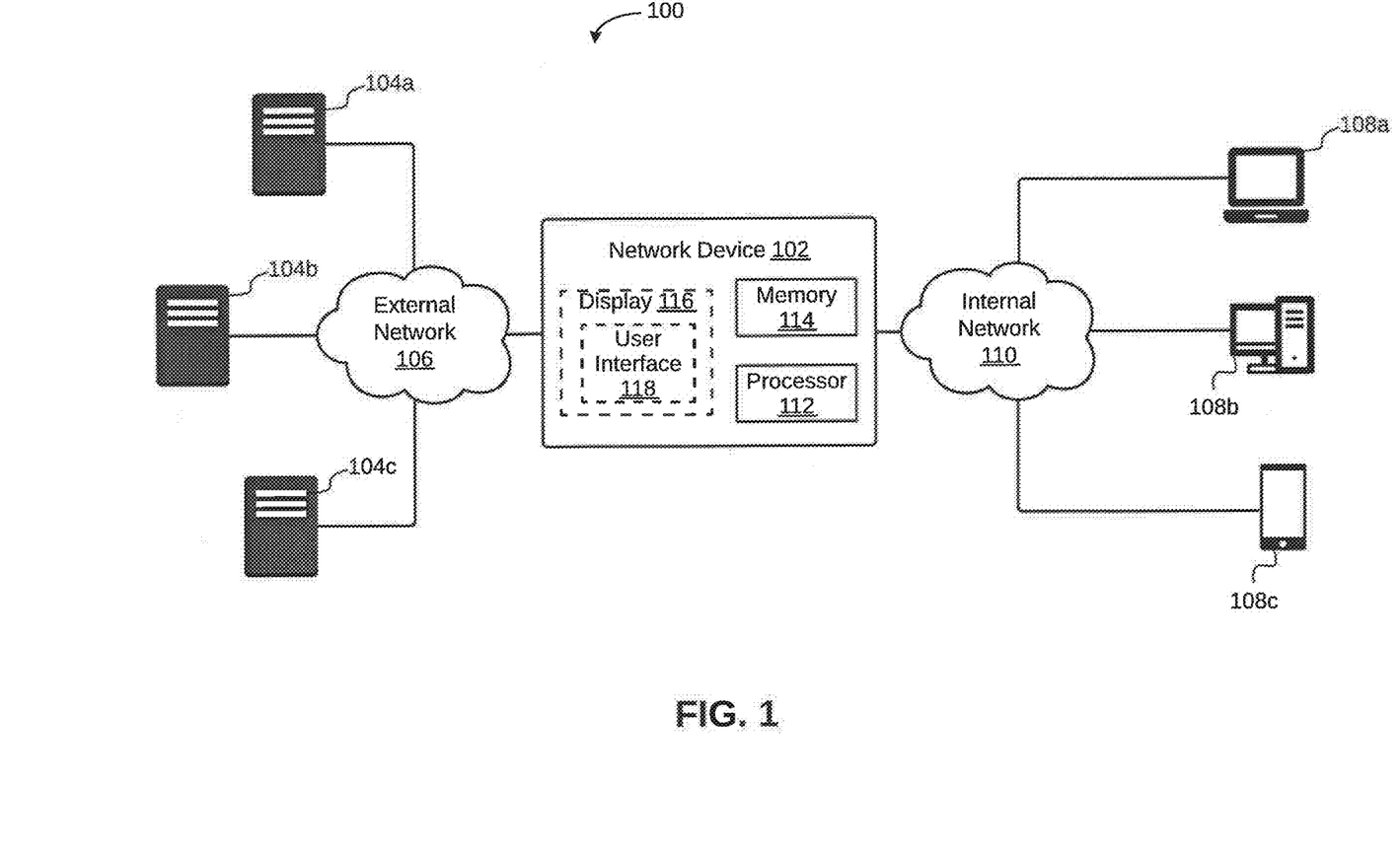
FIG. 1 is a block diagram illustrating a system for classifying Uniform Resource Locators (URLs) and performing actions on the URLs based on the classification, in accordance with an embodiment.

Additional illustrative embodiments are listed below. In one embodiment, a system 100 for classifying Uniform Resource Locators (URLs) and performing actions on the URLs based on the classification. It will be apparent to a person skilled in the art that the URLs may be replaced by Uniform Resource Indicator (URIs) or Uniform Resource Names (URNs). System 100 includes a network device 102, which for example, may include, but is not limited to a server, an application server, network proxy server, cloud proxy server, or a gateway.

Network device 102 may be communicatively coupled to a plurality of servers 104 (which includes a server 104a, a server 104b, and a server 104c) via an external network 106. Plurality of servers 104 may host a website, provide data storage, provide access to audio or video content, or provide email service to one or more users. Network device 102 may connect with one or more of plurality of servers 104, via an external network 106, in order to provide a plurality of computing device 108 (a computing device 108a, a computing device 108b, and a computing device 108c), access to one or more of plurality of servers 104. External Network 106 may be a wired or a wireless network and the examples may include, but are not limited to the Internet, Wireless Local Area Network (WLAN), Wi-Fi, Long Term Evolution (LTE), Worldwide Interoperability for Microwave Access (WiMAX), and General Packet Radio Service (GPRS). Examples of plurality of computing device 108 may include, but are not limited to an application server, a laptop, a desktop, a smart phone, or a tablet.

Plurality of computing devices 108 are communicatively coupled to network device 102 via an internal network 110. Examples of internal network 110 may include but are not limited to LAN, WLAN, MAN, or Wi-Fi. In other words, network device 102 may provide external connectivity to each of plurality of computing device 108 via internal network 110. By way of an example, a user of computing device 108a (which is a desktop) may access a URL for a website hosted on server 104a. The request may be routed to network device 102 via internal network 110 and to server 104a via external network 106. The content provided by server 104a may thereafter be sent to network device 102, which may analyze the content, before sending it to computing device 108a. In other words, network device 102 controls the content that can be accessed by each of plurality of computing devices 108.

Network device 102 may analyze the content request by one or more of plurality of computing devices 108, before providing access to the content. To this end, network device 102 may include a processor 112 that is communicatively coupled to a memory 114, which may be a non-volatile memory or a volatile memory. Examples of non-volatile memory, may include, but are not limited to a flash memory, a Read Only Memory (ROM), a Programmable ROM (PROM), Erasable PROM (EPROM), and Electrically EPROM (EEPROM) memory. Examples of volatile memory may include, but are not limited Dynamic Random Access Memory (DRAM), and Static Random-Access memory (SRAM).

Memory 114 further includes various modules that enable network device 102 to analyze content, received, via external network 106, for one or more of plurality of computing devices 108. These modules are explained in detail in conjunction with FIG. 2. Network device 102 may further include a display 116 having a User Interface (UI) 118 that may be used by a user or an administrator to provide various inputs to network device 102. Display 116 may further be used to display a result of the analysis performed by network device 102. In an embodiment, functionalities of network device 102 may be implemented in each of the plurality of computing devices 108.

Figure 2:
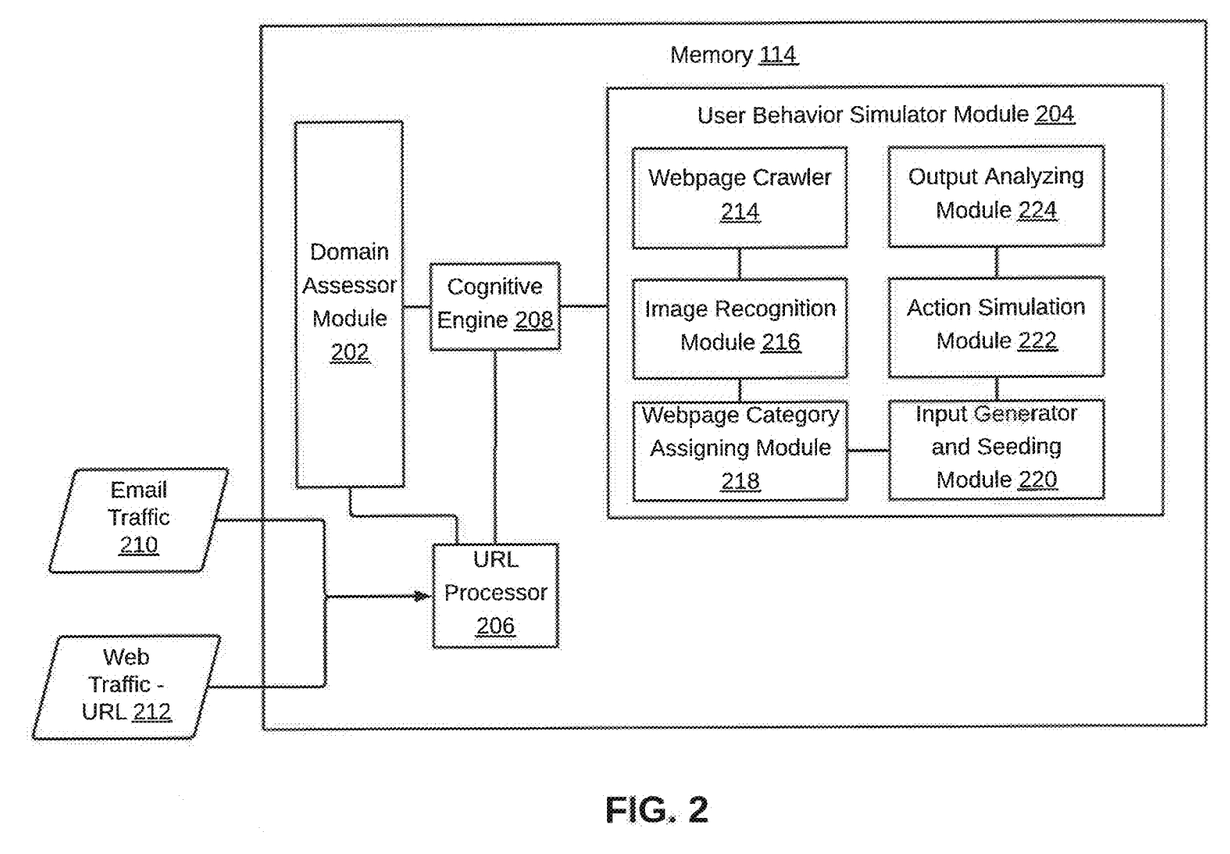
FIG. 2 is a block diagram illustrating various modules within a memory of a network device configured to classifying a URL, in accordance with an embodiment.

Referring now to FIG. 2, a block diagram of various modules within memory 114 of network device 102 configured to classifying a URL is illustrated, in accordance with an embodiment. Memory 114 includes a domain assessor module 202, a user behavior simulator module 204, a URL processor 206, and a cognitive engine 208 that is communicatively coupled to each of domain assessor module 202, user behavior simulator module 204, and URL processor 206.

URL processor 206 may receive the URL via email traffic 210 (i.e., Simple Mail Transfer Protocol (SMTP)) or via web traffic 212 (i.e., Hypertext Transfer Protocol (HTTP)). Once the URL is received or detected, domain assessor module 202 determines one or more URL attributes for the URL. The one or more URL attributes include registration date of an associated domain, age of the associated domain, replica of the associated domain, or ownership of the associated domain. The one or more URL attributes are identified to determine reputation of associated domain, whether IP reputation associated with the URL is that of being used in previous phishing campaigns, whether associated domain has resemblances with a reputed domain, whether associated domain was registered in the past seven days, or whether "A" record was created within seven days after registration of associated domain.

In order to determine IP reputation for an IP address associated with the URL, the history of the IP address with respect to IP owner, IP user, or IP hosting is gathered. Based on this gathered information, IP reputation for the IP address is determined. In order to determine domain reputation for a domain associated with the URL, details that include the history of the domain registration, domain owner, and domain change record is gathered. Domain reputation is determined based on these gathered details. Additionally, to determine whether there is a replica for the domain associated with the URL, it is validated whether the domain seen in the URL is matching any genuine enterprise, government, or financial intuitions. In an embodiment, domain assessor module 202 may include multiple modules to perform the functionalities of determining IP reputation of the IP address associated with the URL, domain reputation for the domain associated with the URL, and replica validator for the URL.

User behavior simulator module 204 simulates a real-time user action on the URL received by URL processor 206, thereby providing visibility and contextual understanding of the type of information that the URL is attempting to retrieve from a user. To this end, user behavior simulator module 204 includes a webpage crawler 214, an image recognition module 216, a webpage category assigning module 218, an input generator and seeding module 220, an action simulation module 222, and an output analyzing module 224.

First, webpage crawler 214 crawls one or more webpages of a website associated with the URL. Once webpage crawler 214 has browsed each of the one or more webpages, webpage crawler 214 captures one or more images associated with each of the one or more webpages. The one or more images may be high resolution images, which are tagged with metadata of the URL information. Webpage crawler 214 may archive the one or more images for further processing.

Thereafter, image recognition module 216, performs OCR on each of the one or more images associated with each webpage in the website. Image recognition module 216, based on the machine learning techniques, identifies each of the plurality of website contents from the one or more images associated with each webpage. The machine-learning techniques are used to recognize website content in each of the one or more webpages and to extract features along with metadata. The plurality of website contents may include, but are not limited to images, textual description, inputs fields, buttons (for example, submit or download), audio or video content, or embedded documents.

Webpage category assigning module 218 then determines a webpage category from a plurality of webpage categories for each of the plurality of website contents. The plurality of website contents may be read to identify a webpage category for each of the one or more webpages. In an embodiment, webpage category assigning module 218 may instantiate multiple micro BOTs, such that, each micro BOT will begin reading the contents of the one or more images individually and correlate in totality to build a network in order to contextualize each feature and website content in the one or more webpages.

Based on this, webpage category assigning module 218 may determine a webpage category for each of the plurality of website contents. The webpage category may include login page (for example, for email or storage), download instruction page, financial information request page (which may include details like a fund transfer page, a One Time Password (OTP) page, a payment processing page, and an expired card activation page), and a personal information gathering page (which may include details like date of birth, social security number, contact details). In order to ascertain a webpage category, webpage category assigning module 218 may use the one or more URL attributes, for example, domain ownership may be used. In an embodiment, webpage category assigning module 218 may compare a logo used in the webpage with the domain ownership details to ascertain a relevant webpage category. In another embodiment, webpage category assigning module 218 may analyze instructions mentioned in textual area of a webpage to determine a relevant webpage category.

Input generator and seeding module 220 uses the machine learning techniques to generate data feeds and parameters as per the associated webpage category. Input generator and seeding module 220 may call the URL of the webpage, which is requesting user inputs, and use the generated parameters and data feed as inputs. Input generator and seeding module 220 also ensure that the generated parameters and data feeds look real to the suspected website. Thus, input generator and seeding module 220 may compare parameters and data feeds seeded in the URL with expected values.

Thereafter, action simulation module 222 initiates simulated actions as expected by the website. Once the data is populated into input fields and submitted, action simulation module 222, in real-time, collates events and user actions behavior details that the website is performing. Action simulation module 222 may further record the output of the simulated user actions for further analysis and may build a mesh of the simulated action and output, which is used for future reference. The results or outputs of simulating user actions may include various connection activity. The connection activity may include, but is not limited to HTTP redirects, HTTP return codes, or image downloads. This is further explained in detail in conjunction with FIG. 3.

Based on results or outputs of simulating the user actions, output analyzing module 224 uses the machine learning techniques, to determine an access classification for the URL. The access classification may include, but is not limited to phishing classification, adult classification, organization specific restriction classification, malware classification, ransomware classification, brokerage or trading classification, business or economy classification, file storage or sharing classification, financial services classification, malicious botnet Command and Control (CnC) classification, malicious malware sources classification, piracy/copyright violation classification, proxy avoidance classification, or software download classification. This is further explained in detail in conjunction with FIG. 3.

Based on the analysis performed by domain assessor module 202 and user behavior simulator module 204, cognitive engine 208 may instruct URL processor 206 to perform one or more actions corresponding to the URL. The one or more actions may include one or more of, but are not limited to blocking the URL, granting access to the URL based on user role in an organization, reporting the URL as harmful, or sending a recommendation to downstream network devices to allow or block the URL. Cognitive engine 208 may further index the information and pattern for continuous learning. This is further explained in detail in conjunction with FIG. 3.

Cognitive engine 208 may use deep-learning algorithms to enhance its intelligence by learning each and every information that is being processed by domain assessor module 202 and user behavior simulator module 204. Thus, cognitive engine 208 may support these modules to perform respective analysis by using machine learning techniques and artificial intelligence for cognitive decisions. Cognitive engine 208 may also build profiles for the webpage content scanned by image recognition module 216.

In an embodiment, cognitive engine 208 may interface with domain assessor module 202 and user behavior simulator module 204 to assist in performance of one or more of the following tasks: generating combination of domain replicas, learning algorithms to recognize content from webpages and assigning webpage categories, generating of seed values for simulating user actions for testing, and analysis of action simulation from human context. Cognitive engine 208 may further build risk and threat profiles for multiple URLs using artificial intelligence. This is further explained in detail with table 1 given in FIG. 4.

Figure 3:
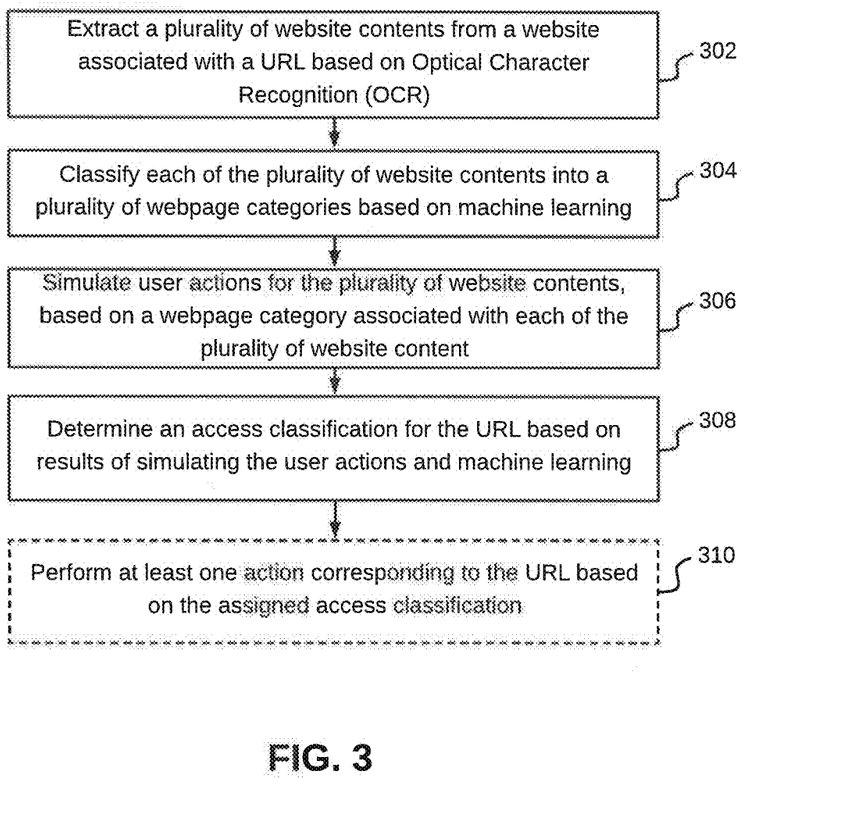
FIG. 3 illustrates a flowchart of a method for classifying a URL based on content of the website associated with the URL, in accordance with an embodiment.

Referring now to FIG. 3, a flowchart of a method for classifying a URL based on content of the website associated with the URL is illustrated, in accordance with an embodiment. Network device 102 may identify a URL from web and email traffic being accessed by one or more of the plurality of computing device 108. Once the URL is identified, at step 302, network device 102 extracts a plurality of website contents from a website associated with the URL, based on Optical Character Recognition (OCR). In order to extract the plurality of website contents, one or more images associated with each webpage in the website are first extracted. Thereafter, OCR is performed on each of the one or more images associated with each webpage in the website.

In an embodiment, in order to extract the plurality of website contents, each webpage provided by the URL is first crawled and processed by a crawler. Once the crawler completes browsing each webpage, the one or more webpages are captured as high-resolution images are tagged with metadata of URL information. The high-resolution images may thereafter be archived for further analysis. This is further explained in detail in conjunction with FIG. 5. The plurality of website contents may include, but are not limited to one or more of images, textual description, inputs fields, buttons, audio, video, embedded documents, paragraphs, links, file paths, forms, Hyper Text Markup Language (HTML) geolocation, or HTML references.

Once the plurality of website contents is extracted, network device 102, at step 304, classifies each of the plurality of website contents into a plurality of webpage categories based on machine learning techniques. The plurality of webpage categories may include, but are not limited to one of a login page, download instruction page, financial information collecting page, or personal information gathering page. In other words, the machine learning techniques may be used to identify a webpage category that best matches one or more webpage contents. By way of an example, when the webpage content for a given webpage includes textual description, such as, "Login" and "Password" along with associated input fields, the webpage content may be classified as "Login Page." By way of another example, the webpage content for a given webpage includes textual description, such as, "Date of Birth," "current address," and "social security number" along with associated input fields, the webpage content may be classified as "personal information gathering page." In order to classify webpage contents into one of a plurality of webpage categories, the machine learning techniques may use various indicators, which are discussed in detail in conjunction with FIG. 4 and FIG. 5.

Once, for each webpage in the website, the plurality of website contents is classified into a webpage category, network device 102, at step 306, simulates user actions for the plurality of website contents, based on an associated webpage category. In an embodiment, the machine learning techniques may generate data feeds and parameters as per the associated webpage category. The machine learning techniques may call the URL of the webpage, which is requesting user inputs, and use the generated parameters and data feed as inputs. The machine learning techniques also ensure that the generated parameters and data feeds look real to the suspected website. To this end, parameters and data feeds seeded in the URL may be compared with expected values. By way of an example, for a "Date Field" the seeded data may be compared with the expected dated format (for example, MM/DD/YYYY). By way of another example, for an email address field, it may be confirmed whether the seeded email address complies with the following format: ".....@.....com." As a result, a simulated action, that is expected by the website (which may be a suspected phishing website) is generated. Thus, the website deems the simulated action as real action.

Once the data is populated into input fields and submitted, events and user actions behavior details that the website is performing are collated in real-time by the machine learning techniques. The output of the simulating user actions is recorded for further analysis. Additionally, the machine learning techniques build a mesh of the simulated action and output, which is used for future reference.

Thereafter, based on results or outputs of simulating the user actions, at step 308, network device 102 uses the machine learning techniques, to determine an access classification for the URL. The access classification may include, but is not limited to phishing classification, adult classification, organization specific restriction classification, malware classification, ransomware classification, brokerage or trading classification, business or economy classification, file storage or sharing classification, financial services classification, malicious botnet Command and Control (CnC) classification, malicious malware sources classification, piracy/copyright violation classification, proxy avoidance classification, or software download classification.

The output or results of simulated actions may be analyzed using the machine learning techniques to check for anomalies, if any. The results or outputs of simulating user actions may include various connection activity. The connection activity may include, but is not limited to HTTP redirects, HTTP return codes, or image downloads.

The connection activity may act as indicators, which may be used to determine an access classification for the URL. Such connection activity may be monitored and logged. Additionally, the connection activity is tagged and stored for the URL. By way of an example, the indicators may be used to determine whether the output includes traces of malicious intent or anomalies, thereby indicating that the URL should be assigned the phishing classification or the malicious classification. In an embodiment, in addition to determining access classification, risk ratings may also be determined for the URL based on the level of risk ascertained for the URL.

For a URL to be classified as malicious, an indicator, for example, may be that after submitting simulated action, the website uses dynamic webpage and redirects the user to original domain that is being impersonated by the URL. By way of another example, the indicator may be that when a simulated action is submitted, multiple error HTTP return codes, for example, 301, 302, 303, or 307, are triggered. By way of yet another example, the indicator may be that image files are loaded from domain which is similar to that of domain that is being impersonated by the URL. By way of another example, an indicator may be that after a simulated action is submitted, the original domain login website being impersonated by the URL is displayed.

Based on the access classification determined for the URL, at step 310, network device 102 performs one or more actions corresponding to the URL. The one or more actions may include one or more of, but are not limited to blocking the URL, granting access to the URL based on user role in an organization, reporting the URL as harmful, or sending a recommendation to downstream network devices to allow or block the URL. By way of an example, if the access classification determined for the URL is malicious classification, network device 102 blocks the URL from being accessed by one or more of plurality of computing devices 108. Network device 102 may further share this information with other downstream network devices. In an embodiment, a central database may be accessed by network device 102 to store such information associated with the URL. By way of another example, based on access policies within an organization, network device 102 may selectively allow access of the URL to a limited set of users only. In an embodiment, the URL may be tagged based on the access classification, and further action may be taken by respective proxy solutions of HTTP and SMTP.

Figure 4:
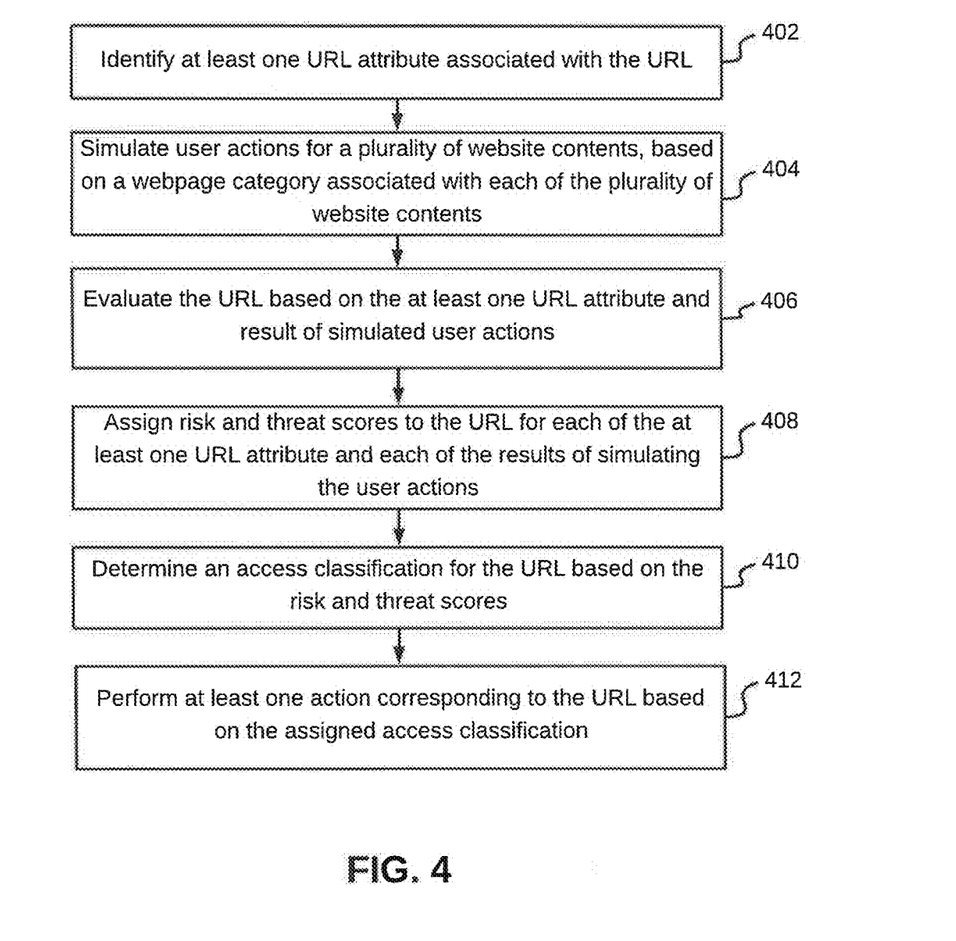
FIG. 4 illustrates a flowchart of a method for extracting a plurality of website contents from a website associated with a URL and classifying each of the plurality of website contents into a plurality of webpage categories, in accordance with an embodiment.

Referring now to FIG. 4, a flowchart of a method for determining an access classification of a URL based on assigned risk and threat score and performing one or more actions on the URL based on the access classification is illustrated, in accordance with an embodiment. At step 402, one or more URL attributes associated with the URL are identified. The one or more URL attributes include registration date of an associated domain, age of the associated domain, replica of the associated domain, or ownership of the associated domain. The one or more URL attributes are identified to determine reputation of associated domain, whether IP reputation associated with the URL is that of being used in previous phishing campaigns, whether the associated domain has resemblances with a reputed domain, whether associated domain was registered in the past seven days, or whether "A" record was created within seven days after registration of the associated domain.

In order to determine IP reputation for the IP address associated with the URL, the history of the IP address with respect to IP owner, IP user, or IP hosting is gathered. Based on this gathered information, IP reputation for the IP address is determined. In order to determine domain reputation for the domain associated with the URL, details that include the history of the domain registration, domain owner, and domain change record are gathered. Domain reputation is determined based on these gathered details. Additionally, to determine whether there is a replica for the domain associated with the URL, it is validated whether the domain seen in the URL matches any genuine enterprise, government or financial intuitions.

Once the one or more URL attributes have been determined for the URL, at step 404, user actions are simulated for a plurality of website contents in a website associated with the URL. The user action may be simulated based on a webpage category associated with each of the plurality of website contents. This has already been explained in detail in conjunction with FIG. 3. In an embodiment, a webpage category may be assigned to a URL based on one or more URL attributes determined at step 402.

At step 406, the URL is evaluated based on the one or more URL attributes and result of the user actions simulated at step 404, which has already been explained in detail in conjunction with FIG. 3. At step 408, risk and threat scores are assigned to the URL for each of the one or more URL attributes and each of the results of simulating the user actions. In an exemplary embodiment, table 1 given below may be used to assign risk and threat scores for a URL:

TABLE 1

| Sensor Module | Threat Score | Risk Score |
| --- | --- | --- |
| Analysis of the output of simulated action | | |
| Webpage content classification | | |
| Replica Domain Validator | | |
| IP Reputation | | |
| Domain Reputation | | |

Based on the assigned threat and risk scores, an access classification is determined for the URL at step 410. The access classification may include, but is not limited to phishing classification, adult classification, organization specific restriction classification, malware classification, ransomware classification, brokerage or trading classification, business or economy classification, file storage or sharing classification, financial services classification, malicious botnet CnC classification, malicious malware sources classification, piracy/copyright violation classification, proxy avoidance classification, or software download classification. This has already been explained in detail in conjunction with FIG. 3.

By way of an example, the URL may be classified as malicious based on the assigned risk and threat scores. Thereafter, at step 412, based on the access classification, an action is performed on the URL. The action may include one or more of blocking the URL, granting access to the URL based on user role in an organization, reporting the URL as harmful, or sending a recommendation to downstream network devices to allow or block the URL. This has already been explained in detail in conjunction with FIG. 3.

Figure 5:
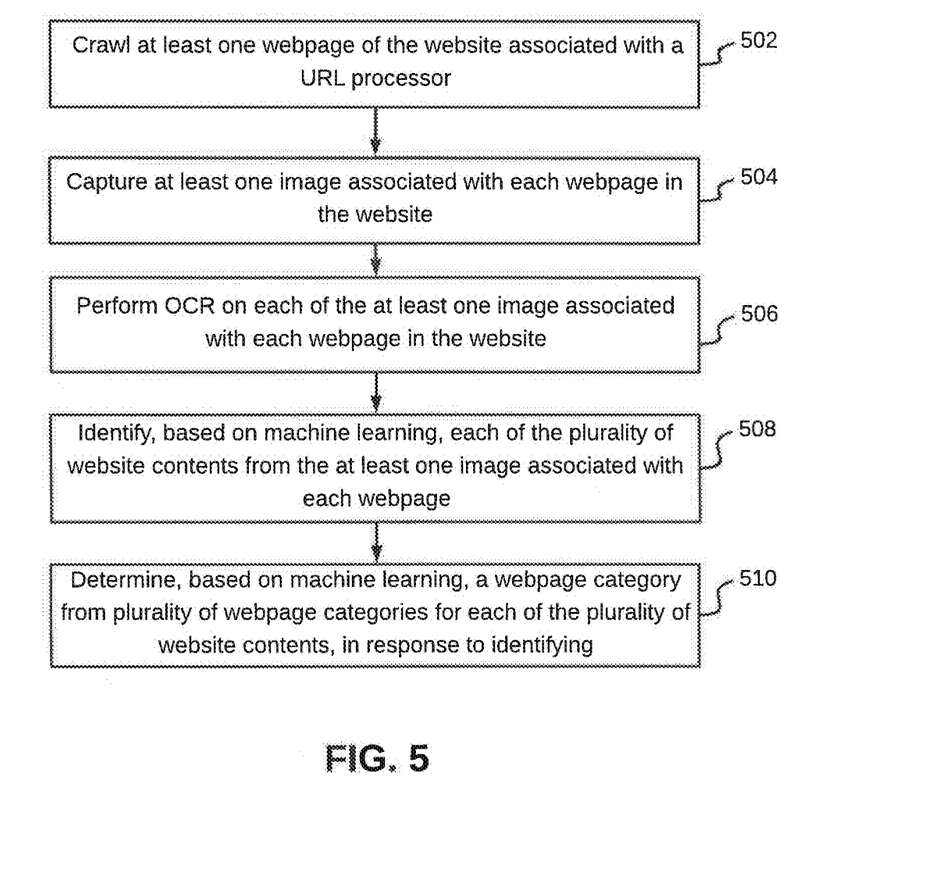
FIG. 5 illustrates a flowchart of a method for determining an access classification of the URL based on assigned risk and threat score and performing one or more actions on the URL based on the access classification, in accordance with an embodiment.

Referring now to FIG. 5, a flowchart of a method for extracting a plurality of website contents from a website associated with a URL and classifying each of the plurality of website contents into a plurality of webpage categories is illustrated, in accordance with an embodiment. At step 502, one or more webpages of the website are crawled. Once browsing of each of the one or more webpages, through crawling, is complete, at step 504, one or more images associated with each of the one or more webpages are captured. The one or more images may be high resolution images, which are tagged with metadata of the URL information. The one or more images may be archived for further processing.

At step 506, OCR is performed on each of the one or more images associated with each webpage in the website. At step 508, based on the machine learning techniques, each of the plurality of website contents are identified from the one or more images associated with each webpage. The machine-learning techniques are used to recognize website content in each of the one or more webpages and to extract features along with metadata. The plurality of website contents may include, but are not limited to images, textual description, inputs fields, buttons (for example, submit or download), audio or video content, or embedded documents.

In response to identifying the plurality of website contents, at step 510, based on the machine learning techniques, a webpage category from plurality of webpage categories is determined for each of the plurality of website contents. The plurality of website contents may be read to identify a webpage category for each of the one or more webpages. In an embodiment, multiple micro BOTs may be instantiated, such that, each micro BOT will begin reading the contents of the one or more images individually and correlate in totality to build a network in order to contextualize each feature and website content in the one or more webpages. Based on this, a webpage category may be determined for each of the plurality of website contents. The webpage category may include login page (for example, for email or storage), download instruction page, financial information request page (which may include details like a fund transfer page, a One Time Password (OTP) page, a payment processing page, and an expired card activation page), and a personal information gathering page (which may include details like date of birth, social security number, contact details).

In order to ascertain a webpage category, one or more URL attributes, for example, domain ownership may be used. To this end, a logo used in the webpage may be compared with the domain ownership details to ascertain a relevant webpage category. In an embodiment, instructions mentioned in textual area of a webpage may be analyzed to determine a relevant webpage category.

Figure 6:
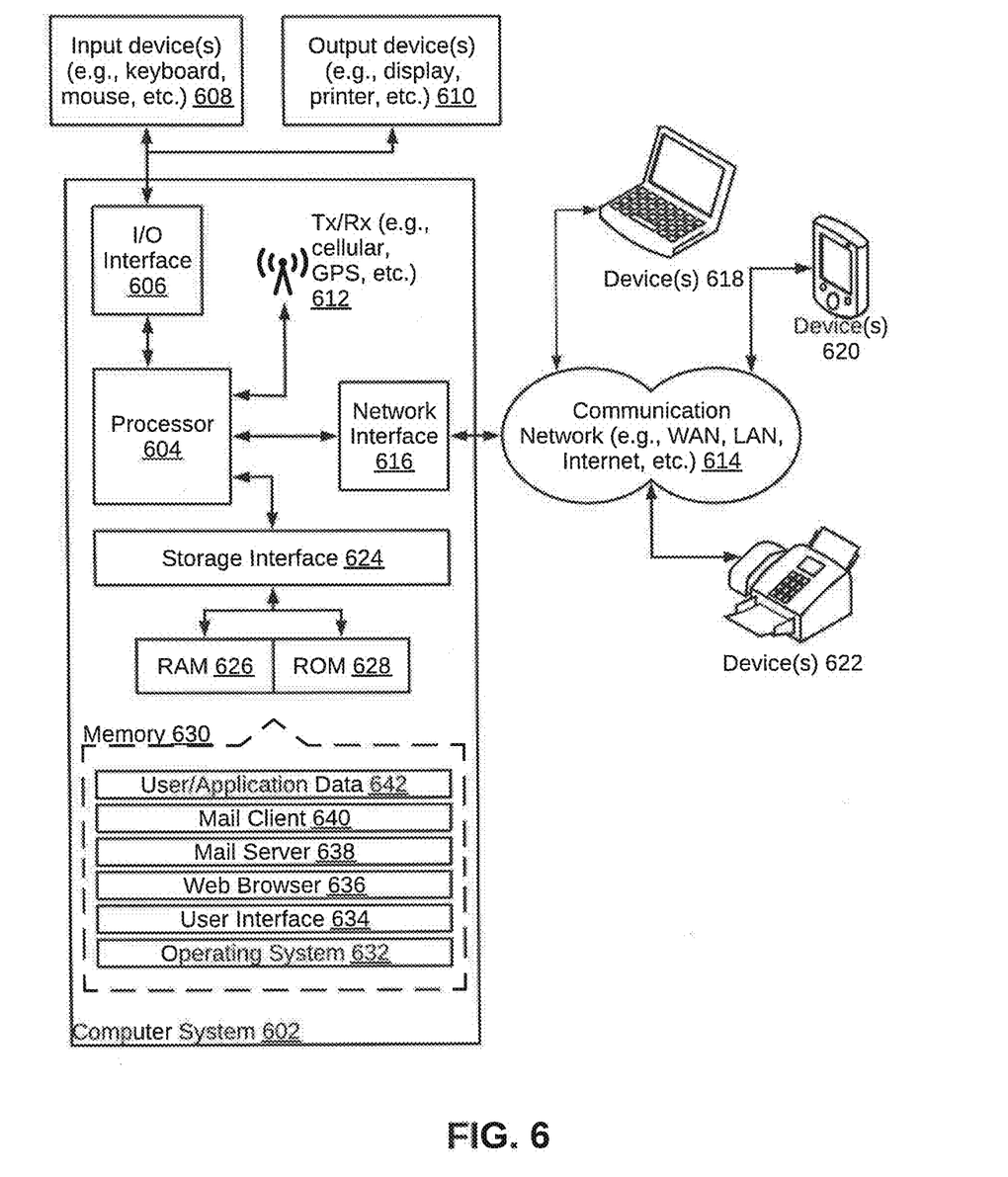
FIG. 6 illustrates a block diagram of an exemplary computer system for implementing various embodiments.

FIG. 6 is a block diagram of an exemplary computer system for implementing various embodiments. Computer system 602 may include a central processing unit ("CPU" or "processor") 604. Processor 604 may include at least one data processor for executing program components for executing user- or system-generated requests. A user may include a person, a person using a device such as such as those included in this disclosure, or such a device itself. Processor 604 may include specialized processing units such as integrated system (bus) controllers, memory management control units, floating point units, graphics processing units, digital signal processing units, etc. Processor 604 may include a microprocessor, such as AMD® ATHLON® microprocessor, DURON® microprocessor OR OPTERON® microprocessor, ARM's application, embedded or secure processors, IBM® POWERPC®, INTEL'S CORE® processor, ITANIUM® processor, XEON® processor, CELERON® processor or other line of processors, etc. Processor 604 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 604 may be disposed in communication with one or more input/output (I/O) devices via an I/O interface 606. I/O interface 606 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using I/O interface 606, computer system 602 may communicate with one or more I/O devices. For example, an input device 608 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. An output device 610 may be a printer, fax machine, video display (e.g., cathode ray tube (CRT), liquid crystal display (LCD), light-emitting diode (LED), plasma, or the like), audio speaker, etc. In some embodiments, a transceiver 612 may be disposed in connection with processor 604. Transceiver 612 may facilitate various types of wireless transmission or reception. For example, transceiver 612 may include an antenna operatively connected to a transceiver chip (e.g., TEXAS® INSTRUMENTS WIL-INK WL1283® transceiver, BROADCOM® BCM4550IUB8® transceiver, INFINEON TECHNOLOGIES® X-GOLD 618-PMB9800® transceiver, or the like), providing IEEE 802.6a/b/g/n, Bluetooth, FM, global positioning system (GPS), 2G/3G HSDPA/HSUPA communications, etc.

In some embodiments, processor 604 may be disposed in communication with a communication network 614 via a network interface 616. Network interface 616 may communicate with communication network 614. Network interface 616 may employ connection protocols including, without limitation, direct connect, Ethernet (e.g., twisted pair 50/500/5000 Base T), transmission control protocol/internet protocol (TCP/IP), token ring, IEEE 802.11a/b/g/n/x, etc. Communication network 614 may include, without limitation, a direct interconnection, local area network (LAN), wide area network (WAN), wireless network (e.g., using Wireless Application Protocol), the Internet, etc. Using network interface 616 and communication network 614, computer system 602 may communicate with devices 618, 620, and 622. These devices may include, without limitation, personal computer(s), server(s), fax machines, printers, scanners, various mobile devices such as cellular telephones, smartphones (e.g., APPLE® IPHONE® smartphone, BLACKBERRY® smartphone, ANDROID® based phones, etc.), tablet computers, eBook readers (AMAZON® KINDLE® ereader, NOOK® tablet computer, etc.), laptop computers, notebooks, gaming consoles (MICROSOFT® XBOX® gaming console, NINTENDO® DS gaming console, SONY® PLAYSTATION® gaming console, etc.), or the like. In some embodiments, computer system 602 may itself embody one or more of these devices.

In some embodiments, processor 604 may be disposed in communication with one or more memory devices (e.g., RAM 626, ROM 628, etc.) via a storage interface 624. Storage interface 624 may connect to memory 630 including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

Memory 630 may store a collection of program or database components, including, without limitation, an operating system 632, user interface application 634, web browser 636, mail server 638, mail client 640, user/application data 642 (e.g., any data variables or data records discussed in this disclosure), etc. Operating system 632 may facilitate resource management and operation of computer system 602. Examples of operating systems 632 include, without limitation, APPLE® MACINTOSH® OS X platform, UNIX platform, Unix-like system distributions (e.g., Berkeley Software Distribution (BSD), FreeBSD, NetBSD, OpenBSD, etc.), LINUX distributions (e.g., RED HAT®, UBUNTU®, KUBUNTU®, etc.), IBM® OS/2 platform, MICROSOFT® WINDOWS® platform (XP, Vista/7/8, etc.), APPLE® IOS® platform, GOOGLE® ANDROID® platform, BLACKBERRY® OS platform, or the like. User interface 634 may facilitate display, execution, interaction, manipulation, or operation of program components through textual or graphical facilities. For example, user interfaces may provide computer interaction interface elements on a display system operatively connected to computer system 602, such as cursors, icons, check boxes, menus, scrollers, windows, widgets, etc. Graphical user interfaces (GUIs) may be employed, including, without limitation, APPLE® Macintosh® operating systems' AQUA® platform, IBM® OS/2® platform, MICROSOFT® WINDOWS® platform (e.g., AERO® platform, METRO® platform, etc.), UNIX X-WINDOWS, web interface libraries (e.g., ACTIVEX® platform, JAVA® programming language, JAVASCRIPT® programming language, AJAX® programming language, HTML, ADOBE® FLASH® platform, etc.), or the like.

In some embodiments, computer system 602 may implement a web browser 636 stored program component. Web browser 636 may be a hypertext viewing application, such as MICROSOFT® INTERNET EXPLORER® web browser, GOOGLE® CHROME® web browser, MOZILLA® FIREFOX® web browser, APPLE® SAFARI® web browser, etc. Secure web browsing may be provided using HTTPS (secure hypertext transport protocol), secure sockets layer (SSL), Transport Layer Security (TLS), etc. Web browsers may utilize facilities such as AJAX, DHTML, ADOBE® FLASH® platform, JAVASCRIPT® programming language, JAVA® programming language, application programming interfaces (APis), etc. In some embodiments, computer system 602 may implement a mail server 638 stored program component. Mail server 638 may be an Internet mail server such as MICROSOFT® EXCHANGE® mail server, or the like. Mail server 638 may utilize facilities such as ASP, ActiveX, ANSI C++/C#, MICROSOFT .NET® programming language, CGI scripts, JAVA® programming language, JAVASCRIPT® programming language, PERL® programming language, PHP® programming language, PYTHON® programming language, WebObjects, etc. Mail server 638 may utilize communication protocols such as internet message access protocol (IMAP), messaging application programming interface (MAPI), Microsoft Exchange, post office protocol (POP), simple mail transfer protocol (SMTP), or the like. In some embodiments, computer system 602 may implement a mail client 640 stored program component. Mail client 640 may be a mail viewing application, such as APPLE MAIL® mail client, MICROSOFT ENTOURAGE® mail client, MICROSOFT OUTLOOK® mail client, MOZILLA THUNDERBIRD® mail client, etc.

In some embodiments, computer system 602 may store user/application data 642, such as the data, variables, records, etc. as described in this disclosure. Such databases may be implemented as fault-tolerant, relational, scalable, secure databases such as ORACLE® database OR SYBASE® database. Alternatively, such databases may be implemented using standardized data structures, such as an array, hash, linked list, struct, structured text file (e.g., XML), table, or as object-oriented databases (e.g., using OBJECTSTORE® object database, POET® object database, ZOPE® object database, etc.). Such databases may be consolidated or distributed, sometimes among the various computer systems discussed above in this disclosure. It is to be understood that the structure and operation of the any computer or database component may be combined, consolidated, or distributed in any working combination.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Various embodiments of the invention provide method and device for classifying uniform resource locators based on content in corresponding websites. The method uses URL imaging recognition and classification technique augmented with cognitive learning in order to detect and prevent phishing attacks. The method simulates a real-time user action on a URL provided in the email or web. This provides visibility and contextual understanding of what fraudster is attempting to get from user. Accordingly, the cognitive engine uses algorithms to detect phishing and blocks a URL if it is ascertained to be suspicious. Since domain assessment and user behavior simulation are performed in parallel, real-time detection and prevention of phishing attack is enabled. Moreover, as deep learning is employed, the cognitive engine may accurately predict a phishing website. The method also provides high level of customization in order to define monitoring thresholds, teach threat patterns, define remediation action, and establish reporting procedure.

Additionally, the method does not rely on a single source for detection and uses a 360-degree review (i.e., based on the domain, the URL and the content of the website associated with the URL). The method has high efficiency in detection and prevention of malicious attacks, as detection is based on deep learning using behavioral patterns. The method is easily scalable with modules (for mobile phones, etc.) and requires minimal human intervention in the entire lifecycle. Thus, end-to-end management of security threats is provided with lower cost of ownership.

The specification has described method and device for classifying uniform resource locators based on content in corresponding websites. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method of classifying Uniform Resource Locators (URLs) based on content in corresponding websites, the method comprising:
    extracting, by a network device, a plurality of website contents from a website associated with a URL based on Optical Character Recognition (OCR);
    classifying, by the network device, each of the plurality of website contents into a plurality of webpage categories based on machine learning;
    simulating, by the network device, user actions, as expected by the website, for the plurality of website contents, based on a webpage category associated with each of the plurality of website contents, wherein the user actions are simulated by generating data feeds and parameters as per the webpage category for use as inputs to the website; and
    determining, by the network device, an access classification for the URL based on results of simulating the user actions and machine learning.

2. The method of claim 1, further comprising identifying at least one URL attribute associated with the URL, wherein the at least one URL attribute comprises registration date of an associated domain, age of the associated domain, replica of the associated domain, or ownership of the associated domain.

3. The method of claim 2, wherein determining the access classification for the URL further comprises:

evaluating the URL based on the at least one URL attribute to determine the access classification; and assigning risk and threat scores to the URL for each of the at least one URL attribute and each of the results of simulating the user actions.

4. The method of claim 1, wherein extracting the plurality of website contents comprises:

capturing at least one image associated with each webpage in the website; and performing OCR on each of the at least one image associated with each webpage in the website.

5. The method of claim 4, wherein classifying each of the plurality of website contents into the plurality of webpage categories comprises:

identifying, based on machine learning, each of the plurality of website contents from the at least one image associated with each webpage; and determining, based on machine learning, a webpage category from plurality of webpage categories for each of the plurality of website contents, in response to identifying.

6. The method of claim 1, wherein the plurality of webpage categories comprises at least one of a login page, download instruction page, financial information collecting page, and personal information gathering page.

7. The method of claim 1, wherein the plurality of website contents comprises at least one of images, textual description, inputs fields, buttons, audio, video, embedded documents, paragraphs, links, file paths, forms, Hyper Text Markup Language (HTML) geolocations, or HTML references.

8. The method of claim 1, further comprising performing at least one action corresponding to the URL based on the determined access classification.

9. The method of claim 8, wherein the at least one action comprises blocking the URL, granting access to the URL based on user role in an organization, reporting the URL as harmful, or sending a recommendation to downstream network devices to allow or block the URL.

10. The method of claim 1, wherein the access classification comprises at least one of phishing classification, adult classification, organization specific restriction classification, malware classification, ransomware classification, brokerage or trading classification, business or economy classification, file storage or sharing classification, financial services classification, malicious botnet Command and Control (CnC) classification, malicious malware sources classification, piracy/copyright violation classification, proxy avoidance classification, or software download classification.

11. A network device for classifying Uniform Resource Locators (URLs) based on content in corresponding websites, the device comprising:

a processor; and a memory communicatively coupled to the processor, wherein the memory stores processor instructions, which, on execution, causes the processor to:

extract a plurality of website contents from a website associated with a URL based on Optical Character Recognition (OCR);

classify each of the plurality of website contents into a plurality of webpage categories based on machine learning;

simulate user actions, as expected by the website, for the plurality of website contents, based on a webpage category associated with each of the plurality of website contents, wherein the user actions are simulated by generating data feeds and parameters as per the webpage category for use as inputs to the website; and determine an access classification for the URL based on results of simulating the user actions and machine learning.

12. The network device of claim 11, wherein the processor instructions further cause the processor to identify at least one URL attribute associated with the URL, wherein the at least one URL attribute comprises registration date of an associated domain, age of the associated domain, replica of the associated domain, or ownership of the associated domain.

13. The network device of claim 12, wherein to determine the access classification for the URL, the processor instructions further cause the processor to:

evaluate the URL based on the at least one URL attribute to determine the access classification; and assign risk and threat scores to the URL for each of the at least one URL attribute and each of the results of simulating the user actions.

14. The network device of claim 11, wherein to extract the plurality of website contents, the processor instructions further cause the processor to:

capture at least one image associated with each webpage in the website; and perform OCR on each of the at least one image associated with each webpage in the website.

15. The network device of claim 14, wherein to classify each of the plurality of website contents into the plurality of webpage categories, the processor instructions further cause the processor to:

identify, based on machine learning, each of the plurality of website contents from the at least one image associated with each webpage; and determine, based on machine learning, a webpage category from plurality of webpage categories for each of the plurality of website contents, in response to identifying.

16. The network device of claim 11, wherein the plurality of website contents comprises at least one of images, textual description, inputs fields, buttons, audio, video, embedded documents, paragraphs, links, file paths, forms, Hyper Text Markup Language (HTML) geolocations, or HTML references.

17. The network device of claim 11, wherein the processor instructions further cause the processor to perform at least one action corresponding to the URL based on the assigned access classification.

18. The network device of claim 17, wherein the at least one action comprises blocking the URL, granting access to the URL based on user role in an organization, reporting the URL as harmful, or sending a recommendation to downstream network devices to allow or block the URL.

19. The network device of claim 11, wherein the access classification comprises at least one of phishing classification, adult classification, organization specific restriction classification, malware classification, ransomware classification, brokerage or trading classification, business or economy classification, file storage or sharing classification, financial services classification, malicious botnet Command and Control (CnC) classification, malicious malware sources classification, piracy/copyright violation classification, proxy avoidance classification, or software download classification.

20. A non-transitory computer-readable storage medium having stored thereon, a set of computer-executable instructions causing a computer comprising one or more processors to perform steps comprising:
- extracting a plurality of website contents from a website associated with a URL based on Optical Character Recognition (OCR);
- classifying each of the plurality of website contents into a plurality of webpage categories based on machine learning;
- simulating user actions, as expected by the website, for the plurality of website contents, based on a webpage category associated with each of the plurality of website contents, wherein the user actions are simulated by generating data feeds and parameters as per the webpage category for use as inputs to the website; and
- determining an access classification for the URL based on results of simulating the user actions and machine learning.

* * * * *